United States Patent [19]
Basu et al.

[11] Patent Number: 5,884,918
[45] Date of Patent: Mar. 23, 1999

[54] BRUSH SEAL WITH A FLEXIBLE FRONT PLATE

[75] Inventors: Prithwish Basu, Pawtucket; John F. Short, North Scituate, both of R.I.

[73] Assignee: EG&G Sealol, Inc., Cranston, R.I.

[21] Appl. No.: 725,896

[22] Filed: Oct. 4, 1996

[51] Int. Cl.[6] .................................................. F16J 15/447
[52] U.S. Cl. ............................................................ 277/355
[58] Field of Search .............................. 415/173.5, 174.5; 277/355

[56] References Cited

U.S. PATENT DOCUMENTS

| | | |
|---|---|---|
| 5,071,138 | 12/1991 | Mackay et al. . |
| 5,174,582 | 12/1992 | Ferguson .................................... 277/53 |
| 5,316,318 | 5/1994 | Veau ........................................ 277/53 |
| 5,318,309 | 6/1994 | Tseng et al. . |
| 5,335,920 | 8/1994 | Tseng et al. ................................ 277/1 |
| 5,351,971 | 10/1994 | Short . |
| 5,401,036 | 3/1995 | Basu . |
| 5,568,931 | 10/1996 | Tseng et al. ............................... 277/53 |

FOREIGN PATENT DOCUMENTS

| | | |
|---|---|---|
| 0 617 216 A1 | 9/1994 | European Pat. Off. . |
| 1049092 | 12/1953 | France ...................................... 277/53 |
| 1523-768-A | 11/1989 | U.S.S.R. . |
| 1 598 926 | 9/1981 | United Kingdom . |
| 2250790 | 6/1992 | United Kingdom ...................... 277/53 |
| 2258277 | 2/1993 | United Kingdom ...................... 277/53 |
| WO 92/14951 | 9/1992 | WIPO . |

*Primary Examiner*—Anthony Knight
*Assistant Examiner*—John L. Beres
*Attorney, Agent, or Firm*—Finnegan, Henderson, Farabow, Garrett & Dunner, L.L.P.

[57] ABSTRACT

A brush seal device for sealing a high pressure area from a low pressure area. The brush seal device comprises a plurality of bristles arranged annularly. An annular back plate is positioned concentric to and on the low pressure side of the bristles, the back plate having a recess adapted to delay contact of the bristles with the back plate upon application of the pressure across the brush seal device. A flexible annular front plate is positioned adjacent to and concentric with the bristles on the high pressure side of the bristles. This combination of elements helps to reduce uneven wear of the bristles in a brush seal device and, therefore, helps to prolong the life of such a seal.

13 Claims, 7 Drawing Sheets

$P_{SYSTEM}$  $P_{DISCHARGE}$ $P_{SYSTEM}$  $P_{DISCHARGE}$ $P_{SYSTEM}$ $P_{DISCHARGE}$

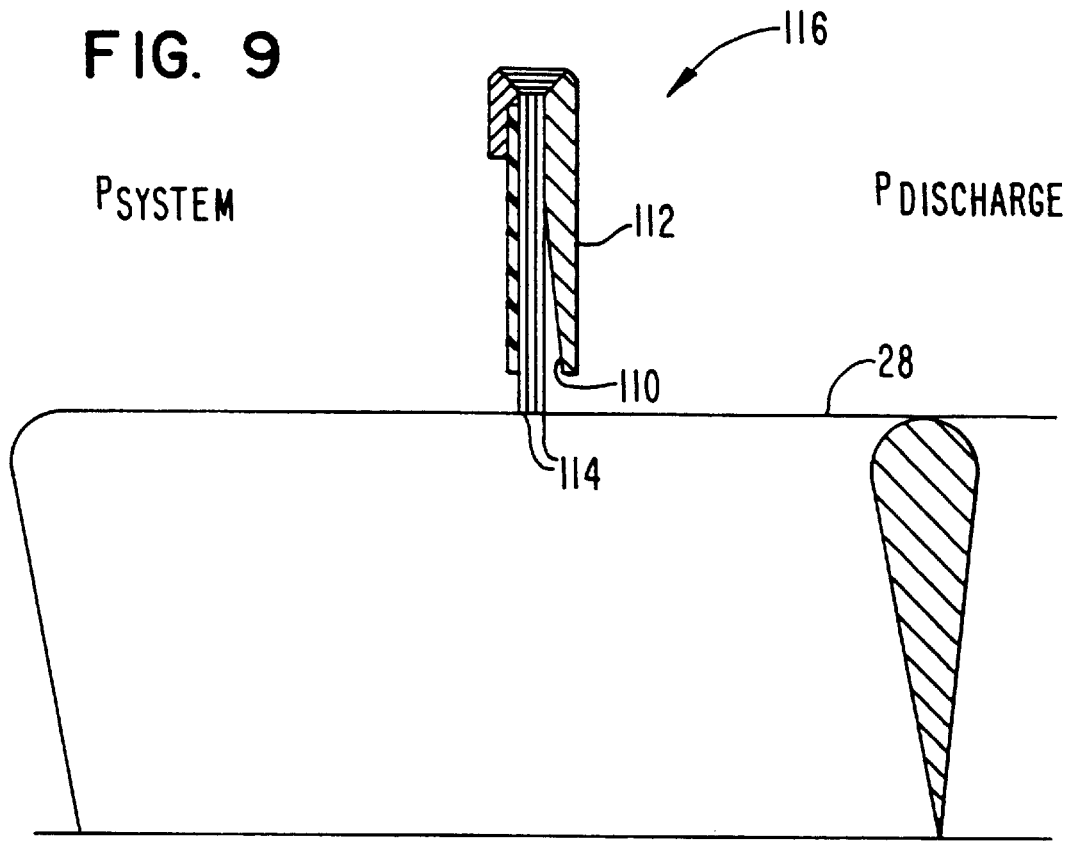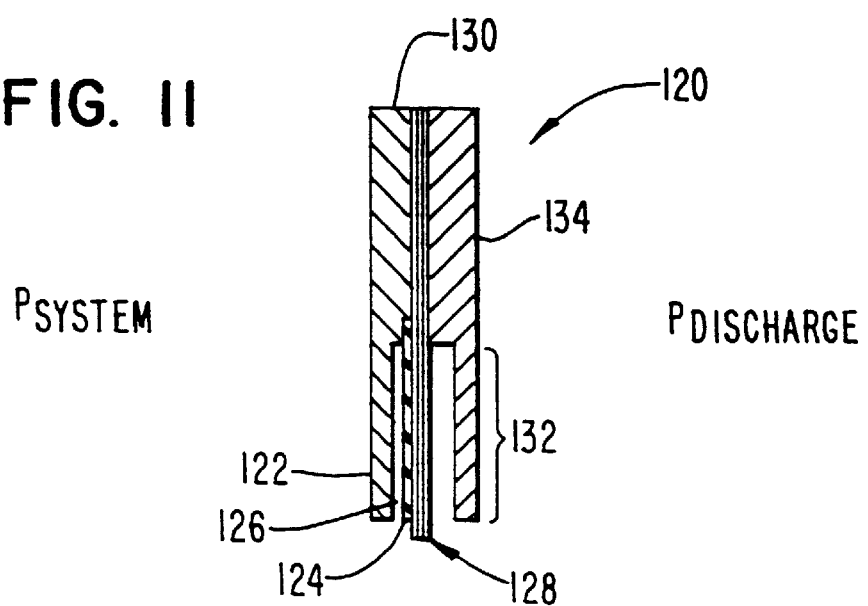

BRUSH SEAL WITH A FLEXIBLE FRONT PLATE

This invention was developed in cooperation with the United States Government, Department of the Air Force, Contract No. PRDA III, F33615-92-C-228.

BACKGROUND OF THE INVENTION

1. Field of the Invention

The present invention relates to brush seals for sealing high pressure fluid areas from low pressure fluid areas, the sealed fluid being a gas or a liquid.

2. Description of the Related Art

Over the last decade, brush seals have emerged as a very promising technology for sealing high pressure areas from low pressure areas, such as those found in gas turbine engines.

Typically, brush seals inhibit flow of a gas (or liquid) in a stream along a shaft. The gas (or liquid) is sealed, for example, within a machine housing which has a system pressure. The outside area of the machine housing, toward which the gas (or liquid) will tend to leak, has a discharge pressure. The system pressure is greater than the discharge pressure, creating a lateral pressure differential. The system pressure side of the brush seal is referred to as the high pressure side, while the discharge pressure side of the brush seal is referred to as the low pressure side.

Conventional brush seals usually include an annular retaining plate, an annular back plate, and a plurality of flexible bristles secured between the annular retaining plate and the annular back plate. The plurality of flexible bristles, otherwise called a bristle pack, extend inwardly from bristle roots at an outer peripheral edge to free ends or tips. The tips of the plurality of flexible bristles run near to or contact the shaft to seal the system pressure from the discharge pressure.

As described in U.S. Pat. No. 5,401,036 (the '036 patent), conventional brush seals exhibit "hysteresis" and "pressure stiffening" effects, which tend to adversely affect the seal performance and life. These effects are considerably attenuated, if not eliminated, by incorporating a "recessed back plate" described in the '036 patent.

A difficulty with the "recessed back plate" brush seal, however, is that it has a tendency to wear unevenly. The flexible bristles on the system pressure side tend to wear to a greater extent than the bristles on the discharge pressure side of the seal for reasons described in detail below. The present invention substantially overcomes this difficulty in the prior art.

SUMMARY OF THE INVENTION

Features and advantages of the invention will be set forth in part in the description that follows, and in part will be apparent from the description, or may be learned by practice of the invention. The objectives and other advantages of the invention may be realized and attained by the elements and combinations particularly pointed out in the written description, claims, and appended drawings.

In summary, to overcome the difficulties inherent in recessed back plate brush seals, the present invention provides a flexible front plate with a plurality of fingers to sandwich the bristles between itself and a rigid back plate. The fingers extend radially inward and may be disposed parallel to the radial direction or at an angle between ±75° from the radial direction. The addition of a flexible front plate appreciably reduces the uneven wearing of the brush seal. As a result, the life of the brush seal is prolonged.

It is noted that the present invention pertains to the recessed back plate brush seals and not conventional brush seals. In fact, the addition of a flexible front plate to a convention seal would reduce the efficiency of such a seal by increasing the hysteresis and pressure stiffening effects considerably, particularly at higher pressures. Without a recessed back plate, the bristle pack necessarily would be sandwiched between the flexible front plate and back plate under pressure and, thereby, the radial flexibility of the bristle pack would be appreciably reduced.

BRIEF DESCRIPTION OF THE DRAWINGS

The accompanying drawings, which are incorporated in and constitute a part of the specification, illustrate several embodiments of the invention, and, together with the general description given above and the detailed description of the embodiments given below, serve to explain the principle of the invention.

In the drawings:

FIG. 9 is a cross-section of a second embodiment of the present invention;

FIG. 11 is a cross-sectional view of still a third embodiment of a brush seal made in accordance with the present invention, illustrating the inclusion of a protective front plate.

DESCRIPTION OF THE PREFERRED EMBODIMENTS

Before describing the embodiments of the present invention, it is first necessary to understand the forces at work that cause the brush seal to wear unevenly. The solution provided by the present invention can then be more fully appreciated.

In the typical brush seal, two forces act on the plurality of flexible bristles. A first force pushes the plurality of flexible bristles laterally (axially) toward the annular back plate. A second force pushes the plurality of flexible bristles radially toward the shaft. The first and second forces act orthogonally to one another.

Under steady state condition, there is usually a small annular gap (0.002–0.005 inches) between the bristle tips and the shaft surface. This gap is known as the "tip region."

Flow of the gas (or liquid) from the system pressure to the discharge pressure through the tip region is referred to as a lateral (or axial) flow and is due to the lateral pressure differential across the brush seal. Radial flow of the gas (or liquid) over the plurality of bristles from the outer peripheral edge of the plurality of flexible bristles to the free ends is due to a radial pressure differential. That radial pressure differential is perpendicular to the lateral pressure differential and results in radial fluid flow.

Figure 3:
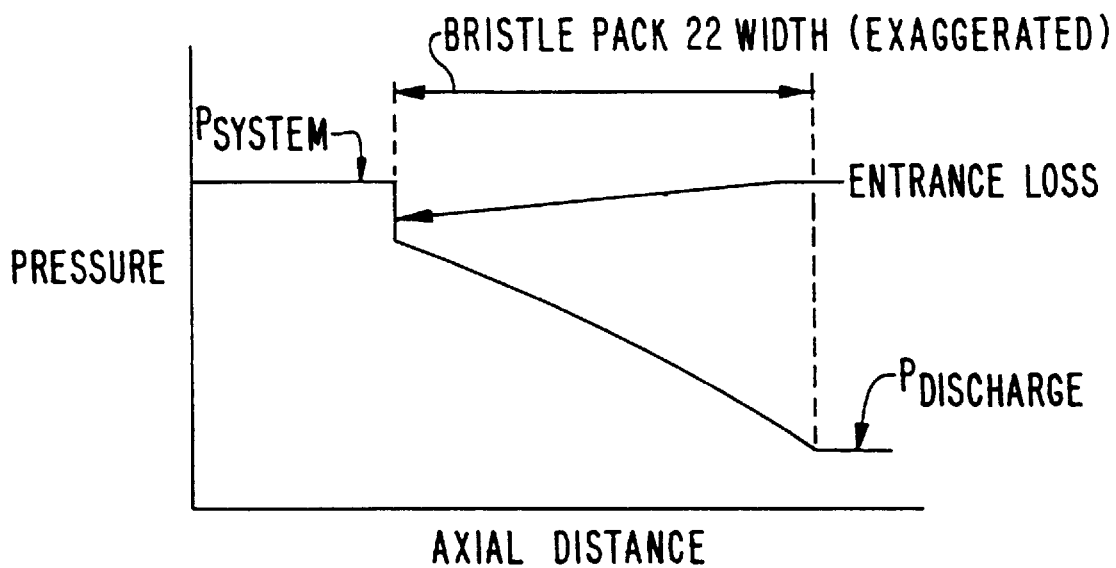
FIG. 3 illustrates graphically the pressure profile in the lateral direction (along the shaft) through the tip region of the brush seal.
Figure 4:
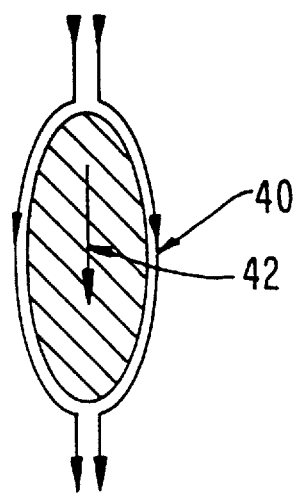
FIG. 4 shows a representative radial flow pattern around a cross-section of an individual bristle in a brush seal.

The radial pressure differential is more pronounced over the first several upstream rows of the bristles than the latter downstream rows. This is due to a loss in fluid pressure at the entrance of the bristle tip region, as depicted in FIG. 3. The loss in fluid pressure at the entrance of the bristle tip region is known as "entrance loss." Since the pressure at the peripheral edge is greater than the pressure at the free ends of the plurality of flexible bristles due to the entrance loss, the fluid flows radially from the peripheral edge of the bristle pack toward the shaft. FIG. 4 shows such a radial flow around a bristle. The cross-section shown in FIG. 4 is elliptic, because it is taken in the radial direction.

The radial fluid flow exerts a radial force on the plurality of flexible bristles that pushes the bristles toward the shaft. The bristles on the high pressure side are subjected to a greater downward force than the bristles on the low pressure side because the radial pressure differential is greater on the high pressure side of the bristle pack than on the low pressure side. As a result, the bristles on the high pressure side tend to bend to a larger degree towards the shaft than the bristles on the low pressure side. This phenomenon has been observed in many brush seals in the laboratory with the help of an optical device called "borescope."

The effect of this second force on the bristles is called the "pressure closure effect." The pressure closure effect is responsible, at least in part, for the accelerated and uneven wear of brush seals. Because of this effect, the bristle tips feed themselves into the running shaft, resulting in accelerated wear. Furthermore, as mentioned, the pressure closure effect is greater on the high pressure side of the brush seal than the low pressure side because of the greater radial force on the bristles on the high pressure side of the bristle pack than the low pressure side. This disparity in the pressure closure effect across the bristle pack causes the bristles to wear unevenly. Uneven wear results in a shorter effective lifetime for the brush seal.

The pressure closure effect, however, is not the only cause of uneven wear that contributes to a reduced seal lifetime. The radial flow not only pushes the bristles toward the shaft, it also causes the bristles to vibrate. Bristles that vibrate are more likely to fail or break off due to fatigue and cyclic stress. The bristles on the high pressure side of the seal have a greater likelihood to fail or break because they are subject to a greater downward radial force and vibrate more vigorously. If the bristles on the high pressure side of the seal break off more frequently than the bristles on the low pressure side of the seal, the seal will wear unevenly. As discussed, uneven wear results in a shorter lifetime for the seal.

To overcome these difficulties, the present invention provides a flexible front plate with a plurality of fingers to sandwich the bristles between itself and a rigid back plate. The flexible front plate reduces the radial flow by reducing the exposure of the bristles to the gas (or liquid) at the system pressure. By reducing the radial flow, there is an appreciable decrease in: (1) the pressure closure effect and (2) bristle vibration. This has been verified experimentally in the laboratory.

Reference will now be made in detail to the preferred embodiments of the present invention, as illustrated in the accompanying drawings, in which like reference characters designated like or corresponding parts throughout the several figures of the drawings.

Figure 1:
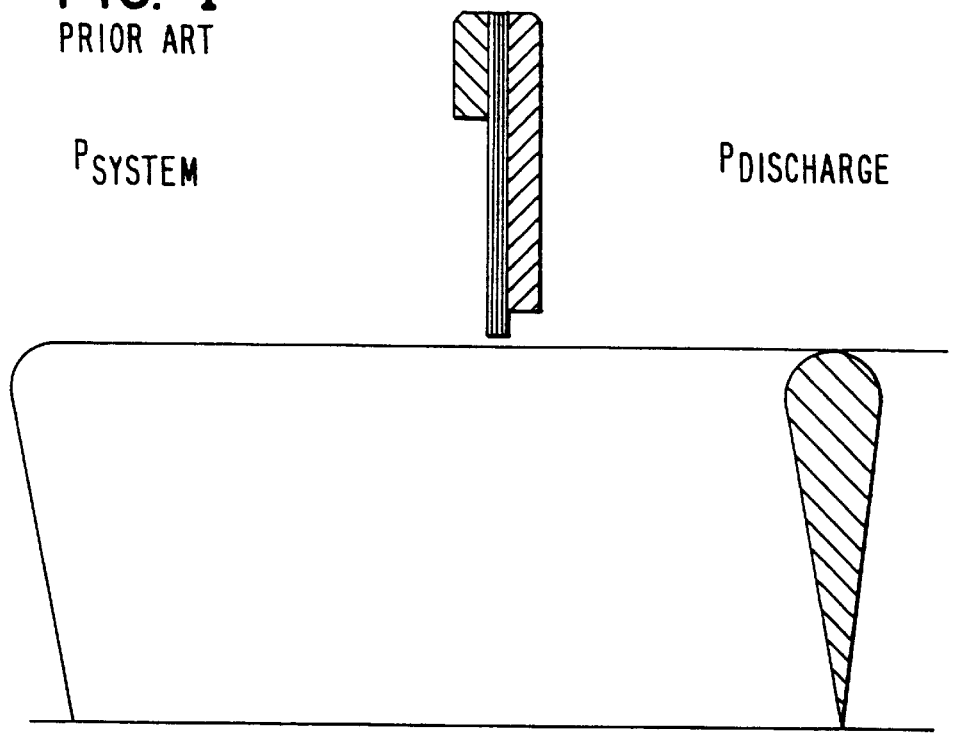
FIG. 1 depicts the cross-section of a conventional brush seal.
Figure 2:
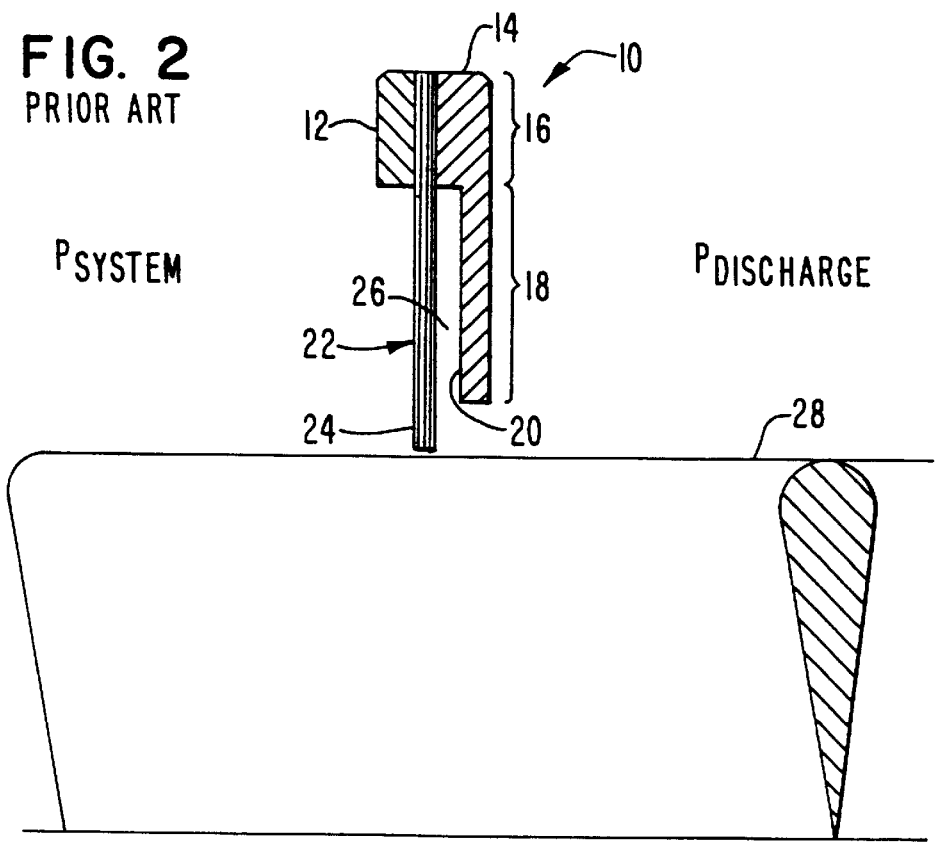
FIG. 2 depicts the cross-section of a recessed back plate brush seal.

A recessed back plate brush seal 10, as disclosed by U.S. Pat. No. 5,401,036, the disclosure of which is incorporated herein by reference, is illustrated in FIG. 2 of the drawings. By its nature, brush seal 10 has a first side that faces a system pressure $P_{system}$ and a second side that faces a discharge pressure $P_{discharge}$. Since system pressure $P_{system}$ is greater than discharge pressure $P_{discharge}$, the first side of brush seal 10 is known as the high pressure side, while the second side is referred to as the low pressure side.

Brush seal IO includes an annular retaining plate 12 with a first side facing system pressure $P_{system}$ and a second side, opposite to the first side.

Brush seal 10 also includes an annular back plate 14 having a first side facing discharge pressure $P_{discharge}$ and a second side, opposite to the first side. The second side of back plate 14 has an outer peripheral portion 16 and a radial inner peripheral portion 18. Inner peripheral portion 18 has a recessed surface 20 formed therein which reduces hysteresis as explained in the '036 patent. Recessed surface 20 may be substantially planar as shown in FIG. 2 or contoured as will be discussed in relation to FIGS. 10(A) through 10(F).

Additionally, brush seal 10 has a bristle pack 22, including a plurality of individual bristles 24, sandwiched between the second side of retaining plate 12 and the second side of back plate 14. Bristles 24 in bristle pack 22 can be secured between retaining plate 12 and annular back plate 14 by a weld (not shown) or by some other mechanism known in the art, depending on the material(s) used for retaining plate 12, bristles 24, and back plate 14. Since inner peripheral portion 18 of back plate 14 is thinner than outer peripheral portion 16, there is an axially extending gap 26 between bristle pack 22 and recessed surface 20 inner peripheral portion 18.

As mentioned earlier, during operation of any brush seal, there is a lateral and radial pressure differential across bristle pack 22. The lateral pressure drop imparts a lateral force on bristles 24 to push bristles 24 across the gap 26 toward recessed surface 20 of back plate 14.

Figure 5:
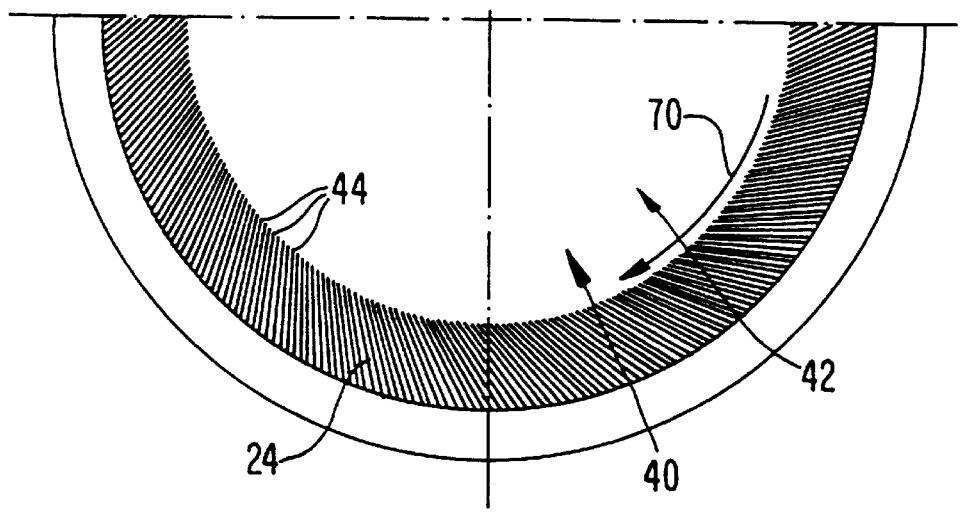
FIG. 5 is a front view of a portion of the bristle pack of a brush seal device.

Also introduced earlier, in brush seal 10, the pressure of the fluid at the free ends of bristles 24 of bristle pack 22 is less than the pressure of the fluid at the peripheral portion. The lower pressure at the free ends of bristles 24 is due, in part, to fluid flow along shaft 28 past bristles 24 and the consequent entrance loss. As shown in FIGS. 4 and 5, the resulting radial pressure differential is responsible for a second fluid flow, a radial fluid flow 40 through bristle pack 22 radially from the peripheral portion toward the inner portion of bristle pack 22.

Radial fluid flow 40 results in a radial pressure drag 42 on bristles 24 which tends to push free ends 44 of bristles 24 toward shaft 28. This is known as the "pressure closure effect." Bristles 24 at the high pressure side of bristle pack 22 are subjected to the greatest magnitude of radial flow 40 and, therefore, are most strongly affected by it. As a result, not only does entire bristle pack 22 go through an accelerated wear process, but also bristles 24 on the high pressure side of bristle pack 22 wear more than bristles 24 on the low pressure side. The greater wear of bristles 24 on the high pressure side of bristle pack 22 causes bristle pack 22 to wear unevenly.

Additionally, radial flow 40, caused by the entrance loss, is great enough to cause bristles 24 to vibrate. This effect is so great on the high pressure side of bristle pack 22 that bristles 24 tend to vibrate wildly. Excessive vibration of bristles 24 increases the chances that bristles 24 may break due to fatigue and cyclic stress. This magnifies the problem of uneven wear of bristle pack 22.

Figure 6:
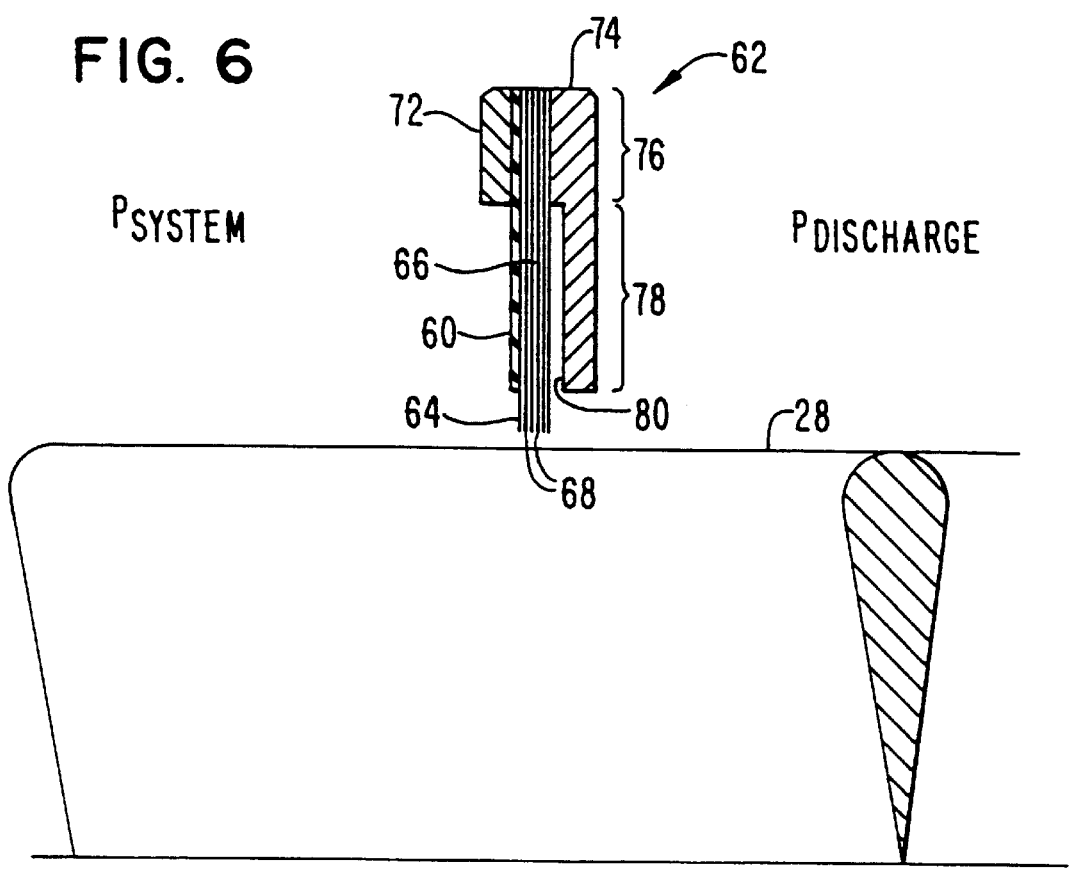
FIG. 6 is a radial cross-section of a brush seal device constructed in accordance with a first embodiment of the present invention.

The present invention solves, in part, the problem of the pressure closure effect and bristle vibration by providing a flexible front plate on the high pressure side of the bristle pack, as shown in FIG. 6 by flexible front plate 60.

In the first embodiment of the present invention, a brush seal 62 is provided for sealing system pressure $P_{system}$ from discharge pressure $P_{discharge}$ having bristles 64 forming bristle pack 66. Bristles 64 extend from the peripheral portion, where the ends are fixed, to an inner portion, where the ends are free. Bristles 64 are disposed at an angle to the radial direction such that free ends 68 of bristles 64 point in the direction of rotation 70 of shaft 28, as shown in FIG. 5.

To retain their shape, especially at higher temperatures, bristles 64 preferably comprise a high temperature nickel-based alloy such as Haynes 25® or Haynes 214® manufactured by Haynes International or ceramic materials such as silicon carbide. Of course, bristles 64 may comprise any suitable material for a particular application.

Brush seal 62 also includes annular retaining plate 72 and back plate 74, as previously described with regard to retaining plate 12 and back plate 14. Bristle pack 66 and flexible front plate 60 are sandwiched between retaining plate 72 and back plate 74. The second side of back plate 74 has an outer peripheral portion 76 and an inner peripheral portion 78. Inner peripheral portion 78 has a recessed surface 80.

Retaining plate 72 and back plate 74 can comprise a nickel based alloy such as Inconel® 625 or 718 manufactured by Inco Alloys International or Haynes 188, manufacturing by Haynes International. However, the composition of retaining plate 72 and back plate 74 can vary depending upon the particular environment in which the brush seal 62 is installed.

Preferably, retaining plate 72 and back plate 74 are configured so that the distance between the outer and inner peripheral edges of retaining plate 72 is substantially equal to the length of outer peripheral portion 76. Further, retaining plate 72 and outer peripheral portion 76 of back plate 74 should extend over only a small portion of bristles 64 at their outer peripheral edge.

Brush seal 62 is characterized by the inclusion of flexible front plate 60 with a plurality of fingers disposed between the second side of annular retaining plate 72 and the high pressure side of bristle pack 66. Flexible front plate 60 contacts or is disposed substantially close to the high pressure side of bristle pack 66.

Specifically, flexible front plate 60 may comprise Inconel 718® made by Inco Alloys International. Of course, any suitable material can be used, depending on the particular application, so long as flexible front plate 60 has a high enough strength to withstand the pressure and the dynamic loading.

Flexible front plate 60 preferably extends from the outer portion of brush seal 62 nearly to the inner diameter of the back plate 74. However, flexible front plate 60 can be fashioned to extend whatever distance is needed toward free ends 68 of bristles 64 to reduce the pressure closure effect and lessen the vibration of bristles 64 due to radial flow 40. The length to which flexible front plate 60 extends toward free ends 68 of bristle 64 depends on the particular application.

Flexible front plate 60 reduces the magnitude the effects of radial flow 40 by presenting a barrier between the fluid at system pressure $P_{system}$ and the bristle pack 66. Flexible front plate 60 does this, however, without interfering with the operation of bristles 64 in bristle pack 66. If flexible front plate 60 does interfere, it does so only minimally.

With the addition of the flexible front plate 60, there is a considerable reduction in radial flow 40 and, hence, radial pressure drag 42, which result in a substantial reduction of the pressure closure effect. Moreover, a reduced radial flow 40 and radial pressure drag 42 result in a proportionally decreased tendency for bristles 64 to vibrate. A decrease in both the pressure closure effect and bristle 64 vibration reduces uneven wear on bristle pack 66. In all, flexible front plate 60 improves the operation of brush seal 62 and extends its life.

Figure 7:
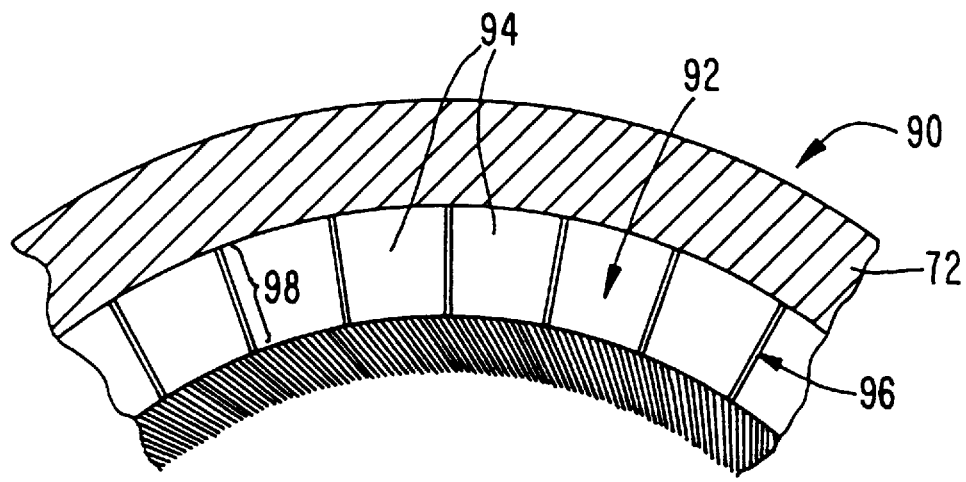
FIG. 7 is a partial sectional front view showing the radially slotted flexible front plate with fingers.
Figure 8:
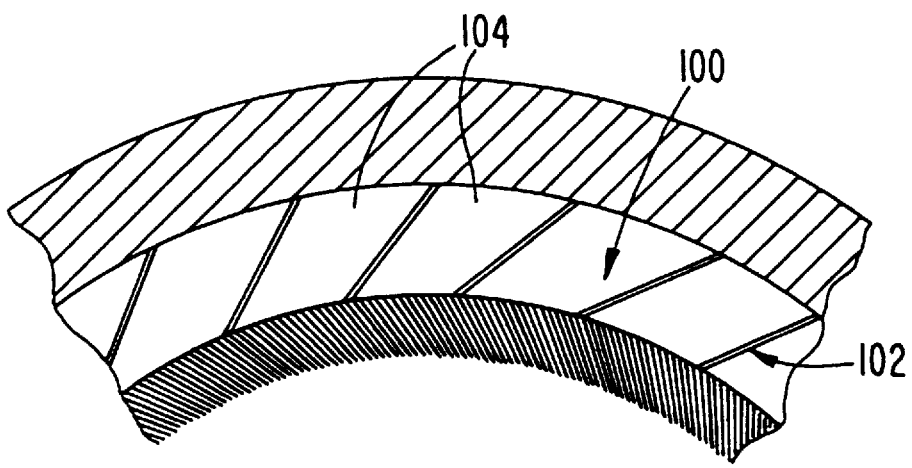
FIG. 8 is a partial sectional front view showing angled fingers in the flexible front plate.

Details about the flexible front plate are illustrated in FIGS. 7 and 8. Brush seal 90 is provided in FIG. 7 wherein a flexible front plate 92 defines a plurality of fingers 94. Fingers 94 are separated by slots 96 that extend a predetermined distance from the inner peripheral edge of flexible front plate 92 toward the inner peripheral edge of retaining plate 72.

Preferably, slots 96 extend radially from the inner peripheral edge of flexible front plate 92 to the inner peripheral edge of retaining plate 72 to provide fingers 94 with maximum flexibility. However, it is possible that slots 96 need not extend a full distance 98 from the inner peripheral edge of flexible front plate 92 to the inner peripheral edge of retaining plate 72 or extend beyond the full distance 98 for flexible front plate 92 to function sufficiently well to substantially reduce radial flow.

While the preferred orientation of the slots 96 is 0° to the radial direction, the slots alternatively may be disposed at an angle to the radial direction. As shown in FIG. 8, flexible front plate 100 may have angled slots 102 that create angled fingers 104. Angled fingers 104 may be disposed preferably at an angle of ±75° from the radial direction. Angled slots 102 may be preferred to radially oriented slots where the radial envelope is tight, i.e., where the radial distance between shaft 28 and the inner peripheral edge of retaining plate 72 is small. In such a case, angled slots 102 create angled fingers 104 with greater flexibility than those that would be created with radial slots 96.

For both radial and angled slots, fingers 94 and 104 should have a lateral flexibility that is greater than the lateral flexibility of bristles 64 adjacent the respective fingers, so that the fingers follow bristle pack 66 without separation when pressure is applied. This will ensure blockage of radial flow.

It is further contemplated that the slots 96 or 102 are in the range of 4 to 12 mils wide. Also, the fingers 94 or 104 are preferably in the range of 3 to 20 mil thick. More preferably, fingers 94 or 104 are contemplated to be in the range of 4 to 7 mils thick.

The second embodiment of the present invention is described in FIG. 9. One difference between the first and the second embodiments is the inclusion of contoured recessed surface 110 for back plate 112. FIGS. 10(A) through (F) show several possible designs of the surface. Hence, depending on the shape of recessed surface 110, the gap between the bristle pack 64 and recessed surface 110 may be uniform or radially varying.

Figure 10A:
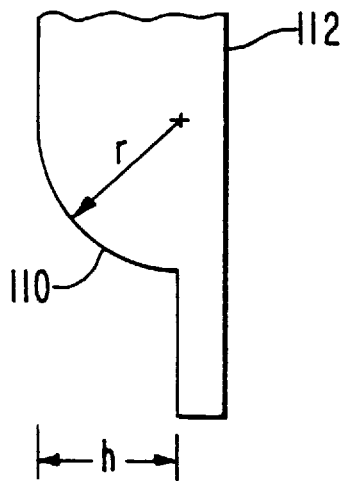
FIGS. 10(A)–(F) show several representative constructions of the contoured recessed surface of the backplate.
Figure 10B:
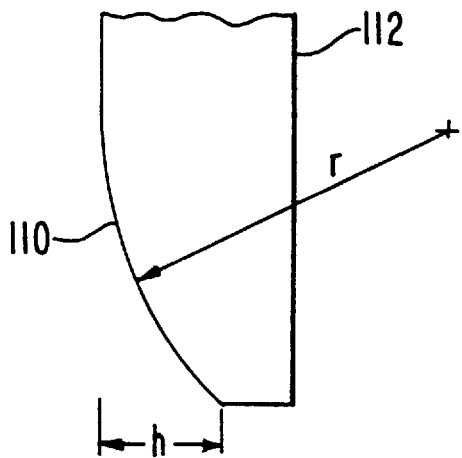
Figure 10C:
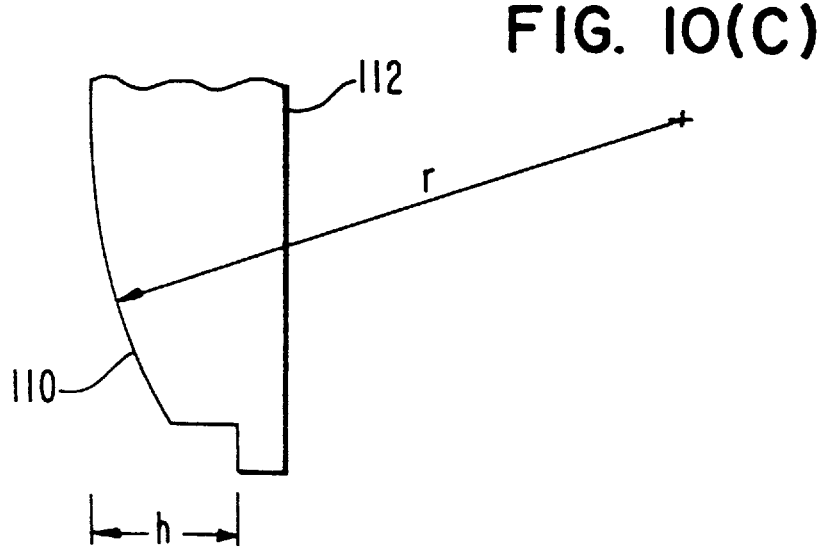

FIGS. 10(A), 10(B), and 10(C) illustrate several possible designs for the recessed surface 110. As shown, both the radius of curvature r of the contour at the bristle roots and the depth h of the recessed surface 110 at the inner peripheral edge of back plate 112 may vary. For example, the radius of curvature r of the contour at the bristle roots may vary between 0–2 inches, and the depth h of the recessed surface 110 at the inner peripheral edge of the back plate 112 may vary from 0.005–0.120 inch. It should be noted that the depth h is preferably chosen such that the bristles 114 barely touch the recessed surface 110 when at operating pressure.

By contouring the recessed surface 110 in this manner, reaction forces at the roots of the bristles 114 are not concentrated at a single point, but instead are spread over a finite region of the bristles, thereby reducing the maximum stress. Thus, the brush seal device 116 may accommodate higher pressure differentials.

Figure 10D:
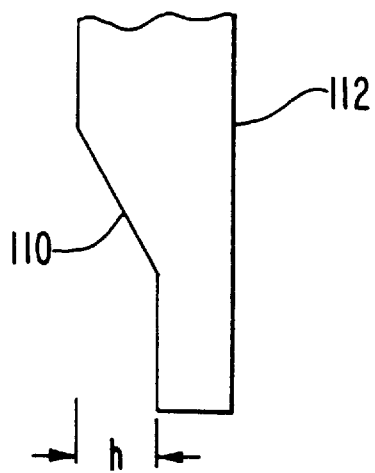
Figure 10E:
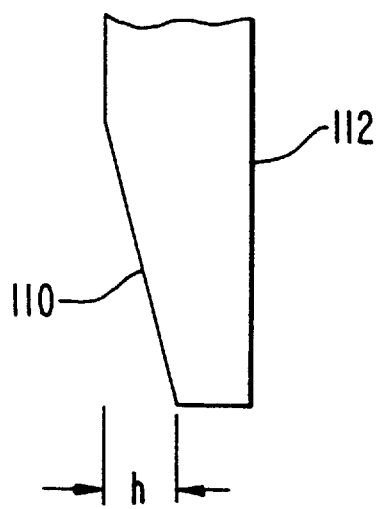
Figure 10F:
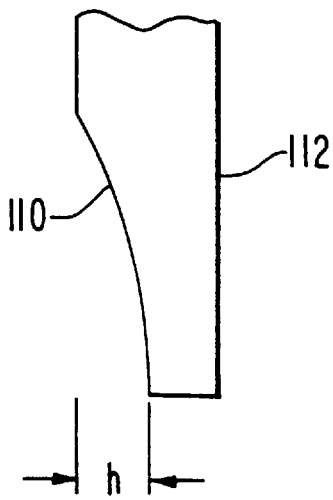

Some other possible designs for the recessed surface 110 are shown in FIGS. 10(D), 10(E) and 10(F).

The third embodiment of the present invention will be described in relation to FIG. 11. In the third embodiment, brush seal 120 includes rigid front plate 122. Rigid front plate 122 is disposed a distance from flexible front plate 124, creating a gap 126 between rigid front plate 122 and flexible front plate 124.

Rigid front plate 122 is positioned in front of flexible front plate 124 to provide protection for flexible front plate 124 and bristle pack 128, especially during the handling and installation of brush seal 120 in a particular application. Rigid front plate 122 preferably extends from the inner peripheral edge of retaining plate 130 and is coextensive with inner peripheral portion 132 of back plate 134. However, as may be apparent, this is not required to practice the present invention.

In a preferred embodiment, it is contemplated that rigid front plate 122 be a part of retaining plate 130 as shown in FIG. 11. However, rigid front plate 122 may be added as a plate that is separate from retaining plate 130. Accordingly, it is preferred that rigid front plate 122 be made of the same material as retaining plate 130 or back plate 134. As mentioned, this can be a nickel based alloy such as Inconel® 625 or 718 manufactured by Inco Alloys International or Haynes 188, manufactured by Haynes International, but this is not required to practice the present invention.

Finally, brush seal 120 alternatively may include contoured recessed back plate 110 as shown in FIGS. 9 and 10.

It should be apparent from the foregoing discussion that the present invention provides for a brush seal device having improved characteristics over conventional or simple recessed back plate designs. In particular, the brush seal device of the present invention reduces the "pressure closure effect" associated with simple recessed back plate seals, thereby extending the life of the device and improving its pressure sealing capabilities.

Additional advantages and modification will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A brush seal device for sealing a high pressure area from a low pressure area, said brush seal device comprising:
   a plurality of bristles arranged annularly;
   an annular back plate positioned concentric to and on the low pressure side of said bristles, said back plate having a recessed surface adapted to delay contact of said bristles with said back plate upon application of pressure across said seal device; and
   a flexible annular front plate positioned concentric to said bristles and sufficiently close to said bristles on the high pressure side to beneficially effect radial fluid flow through said bristles, the flexible front plate having a thickness in the range of about 4 to 7 mils and a lateral flexibility greater than a lateral flexibility of the bristles so that the flexible front plate follows the bristles upon application of pressure across said seal device and blocks radial fluid flow through the bristles.

2. The brush seal device of claim 1, wherein said flexible front plate defines a plurality of fingers.

3. The brush seal device of claim 2, wherein the lateral flexibility of each said finger is greater than the lateral flexibility of a section of bristles adjacent said finger.

4. The brush seal device of claim 2, wherein said fingers are formed by slots extending from the inner peripheral edge of said flexible front plate.

5. The brush seal device of claim 2, wherein said bristles extend at an angle from a radial direction.

6. The brush seal device of claim 2, wherein said fingers extend radially inward of said flexible annular front plate.

7. The brush seal device of claim 2, wherein said fingers extend inwardly of said annular front plate at an angle from radial direction.

8. The brush seal device of claim 7, wherein said angle is between ±75 degrees, a positive angle indicating the same direction as the bristles and a negative angle indicating the opposite direction to the bristles.

9. The brush seal device of claim 8, wherein said angle is approximately 0°.

10. The brush seal device of claim 4, wherein said slots are in the range of 4 to 12 mils wide.

11. The brush seal device of claim 1, wherein said seal device includes a rigid annular front plate positioned concentric to and on the high pressure side of said flexible annular front plate, said rigid front plate having substantially the same internal diameter as said flexible annular front plate and positioned sufficiently close to said flexible annular front plate to afford protection thereof.

12. The brush seal device of claim 1, wherein the recessed surface is substantially planar.

13. The brush seal device of claim 1, wherein the recessed surface is contoured to increase in depth toward an inner peripheral edge of said back plate.

* * * * *